United States Patent
Hauptmann et al.

(10) Patent No.: US 8,489,268 B2
(45) Date of Patent: Jul. 16, 2013

(54) METHOD AND DEVICE FOR OPERATING A MOTOR VEHICLE

(75) Inventors: Werner Hauptmann, Höhenkirchen (DE); Kai Heesche, München (DE)

(73) Assignee: Continental Automotive GmbH, Hannover (DE)

( * ) Notice: Subject to any disclaimer, the term of this patent is extended or adjusted under 35 U.S.C. 154(b) by 184 days.

(21) Appl. No.: 13/054,223

(22) PCT Filed: Jul. 29, 2009

(86) PCT No.: PCT/EP2009/059816
§ 371 (c)(1),
(2), (4) Date: Jan. 14, 2011

(87) PCT Pub. No.: WO2010/012778
PCT Pub. Date: Feb. 4, 2010

(65) Prior Publication Data
US 2011/0118930 A1    May 19, 2011

(30) Foreign Application Priority Data
Jul. 31, 2008    (DE) .......................... 10 2008 035 663

(51) Int. Cl.
*G01M 17/00* (2006.01)
(52) U.S. Cl.
USPC .......................... 701/29.1; 701/22; 180/65.21
(58) Field of Classification Search
USPC .............. 701/29.1, 30.9, 31.1, 22; 180/65.21, 180/65.31
See application file for complete search history.

(56) References Cited

U.S. PATENT DOCUMENTS

| | | | |
|---|---|---|---|
| 5,627,752 A | 5/1997 | Buck et al. | 364/424.04 |
| 6,381,522 B1 | 4/2002 | Watanabe et al. | 701/22 |
| 6,687,581 B2 * | 2/2004 | Deguchi et al. | 701/22 |
| 6,687,607 B2 * | 2/2004 | Graf et al. | 701/99 |
| 7,147,072 B2 * | 12/2006 | Botti | 180/65.25 |
| 7,973,505 B2 * | 7/2011 | Suhama et al. | 318/432 |

(Continued)

FOREIGN PATENT DOCUMENTS

| | | |
|---|---|---|
| DE | 4344369 A1 | 7/1995 |
| DE | 10005581 A1 | 10/2000 |

(Continued)

OTHER PUBLICATIONS

International PCT Search Report and Written Opinion, PCT/EP2009/059816, 11 pages, Mailed Dec. 21, 2009.

*Primary Examiner* — Thomas Black
*Assistant Examiner* — Shardul Patel
(74) *Attorney, Agent, or Firm* — King & Spalding L.L.P.

(57) ABSTRACT

A predefined operating strategy permits a predefined operating mode of the motor vehicle. A first operating variable value of the operating mode and/or one additional variable value, which is independent of the operating mode are sensed and one estimated value is determined depending thereon, which is representative of one expected value of the one first operating variable of a second operating variable of the operating mode. One predicted value is determined depending on the sensed values of the one first operating variable, the one additional variable, and/or the one determined estimated value. The predicted value represents an expected operating state and is compared with one predefined comparison value, which is representative of one predefined operation state. The operating strategy is set as a function of the comparison and of the at least one estimated variable in such a way that the predefined operating state is as far as possible avoided.

14 Claims, 4 Drawing Sheets

U.S. PATENT DOCUMENTS

| | | | |
|---|---|---|---|
| 8,335,605 B2 * | 12/2012 | Mueller et al. | 701/22 |
| 8,360,180 B2 * | 1/2013 | Hoff et al. | 180/65.265 |
| 2002/0107618 A1 | 8/2002 | Deguchi et al. | 701/22 |
| 2002/0188387 A1 | 12/2002 | Woestman et al. | 701/22 |
| 2004/0030471 A1 * | 2/2004 | Faye | 701/22 |
| 2011/0276209 A1 * | 11/2011 | Suganuma et al. | 701/22 |

FOREIGN PATENT DOCUMENTS

| | | |
|---|---|---|
| DE | 10129149 A1 | 1/2002 |
| DE | 10128758 A1 | 12/2002 |
| EP | 1256476 A2 | 11/2002 |
| EP | 1270303 A2 | 1/2003 |

* cited by examiner

METHOD AND DEVICE FOR OPERATING A MOTOR VEHICLE

CROSS-REFERENCE TO RELATED APPLICATIONS

This application is a U.S. National Stage Application of International Application No. PCT/EP2009/059816 filed Jun. 29, 2009, which designates the United States of America, and claims priority to German Application No. 10 2008 035 663.8 filed Jul. 31, 2008, the contents of which are hereby incorporated by reference in their entirety.

TECHNICAL FIELD

The present invention concerns a method and device for operating a motor vehicle.

BACKGROUND

The specialist book "Vieweg-Handbuch Kraftfahrzeugtechnik [Vieweg Motor Vehicle Engineering Manual" from Braess and Seiffert, Vieweg Publishing, 4th edition, pages 126 and 127 discloses hybrid drives in motor vehicles which comprise at least two energy converters. The two energy converters are embodied, for example, as an internal combustion engine and an electric motor, which can cooperate in different ways. For example, said energy converters can drive the wheels of the motor vehicle in parallel, for example by internal combustion engine and/or electrically. In addition, the energy converters can be arranged serially, wherein the wheels are driven in a purely electrical way and the energy required to do this is generated by the internal combustion engine in conjunction with a generator.

SUMMARY

According to various embodiments, a method and a device for operating a motor vehicle can be specified which permit particularly efficient operation of the motor vehicle.

According to an embodiment, in a method for operating a motor vehicle, an operating strategy is predefined for the motor vehicle, wherein the operating strategy permits a predefined operating mode of the motor vehicle, values of at least a first operating variable of the predefined operating mode and/or values of at least an additional variable which is independent of the predefined operating mode are detected, at least one estimated value, which is representative of at least one anticipated value of the at least one first operating mode variable or at least one second operating variable of the predefined operating mode, is determined as a function of the values of the at least one first operating variable and/or the values of the at least one additional variable, at least one prediction value, which is representative of an anticipated operating state of the motor vehicle, is determined as a function of the detected values of the at least one first operating variable and/or the detected values of the at least one additional variable and/or the determined at least one estimated variable, the at least one determined prediction value is compared with at least one predefined comparison value, which is representative of at least one predefined operating state of the motor vehicle, the operating strategy is set as a function of a result of the comparison and as a function of the at least one estimated value in such a way that the motor vehicle is operated in such a way as to avoid the at least one predefined operation state.

According to a further embodiment, at least two forecast values, which each represent an anticipated operating state of the motor vehicle and which are each assigned to different future time intervals, can be determined as a function of the detected values of the at least one first operating variable and/or the detected values of the at least one additional variable and/or the at least one determined estimated value, and the at least one prediction value is determined as a function of the at least two forecast values. According to a further embodiment, the at least two forecast values can be determined by means of at least one artificial neural network. According to a further embodiment, the at least two forecast values can be determined as a function of the availability of the at least one additional variable either by means of a first artificial neural network or by means of a second artificial neural network. According to a further embodiment, the prediction value can be determined as a function of a chronological sequence of the at least two forecast values.

According to another embodiment, a device for operating a motor vehicle, may have a decision unit, which is designed to predefine an operating strategy for the motor vehicle, wherein the operating strategy permits a predefined operating mode of the motor vehicle, a data detection unit which is designed to detect values of at least a first operating variable of the predefined operating mode and/or at least an additional variable which is independent of the predefined operating mode, an estimation unit which is designed to determine at least one estimated value, which is representative of at least one anticipated value of the at least one first operating variable or the at least one second operating variable, as a function of the values of the at least one first operating variable and/or the values of the at least one additional variable, a forecast unit which is designed to determine at least one prediction value, which is representative of an anticipated operating state of the motor vehicle, as a function of the detected values of the at least one first operating variable and/or the detected values of the at least one additional variable and/or the determined at least one estimated value, a comparison unit which is designed to compare the at least one determined prediction value with at least one predefined comparison value which is representative of at least one predefined operating state of the motor vehicle, and to actuate the decision unit, as a function of a result of the comparison and as a function of the at least one estimated value, in such a way that the operating strategy is set in such a way that the motor vehicle is operated in such a way as to avoid the at least one predefined operating state.

According to a further embodiment of the device, the motor vehicle may have a hybrid drive with a first and a second energy converter and with at least one energy store, wherein the first energy converter is embodied as an electric machine, and the device is designed to actuate the first and second energy converters as a function of the operating strategy.

BRIEF DESCRIPTION OF THE DRAWINGS

Exemplary embodiments are explained in more detail below with reference to the schematic drawings, in which.

Elements with the same design or function are characterized by the same reference symbols in all the figures.

DETAILED DESCRIPTION

Figure 1:
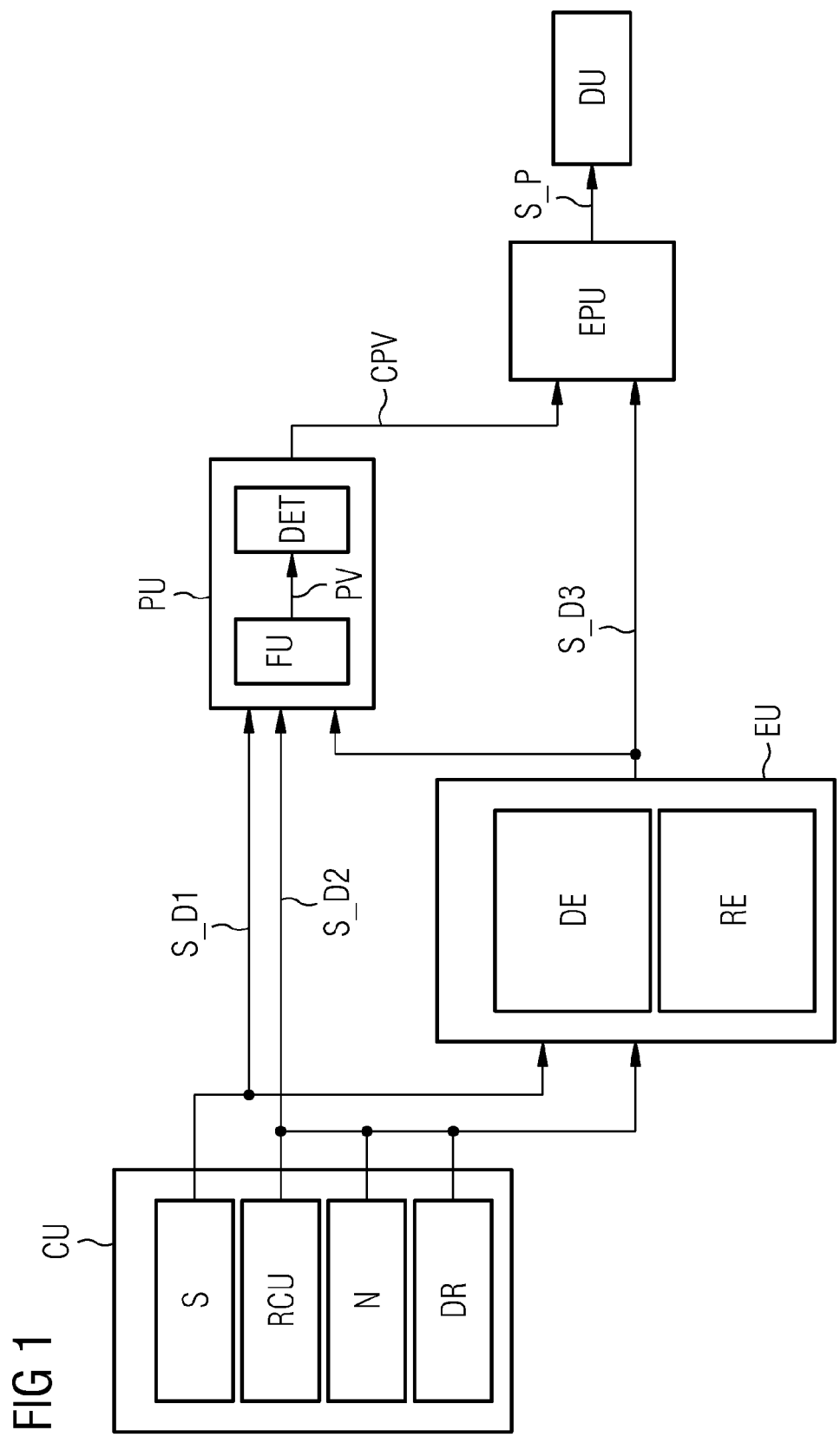
FIG. 1 shows an energy management system.

According to various embodiments, in a method and a corresponding device for operating a motor vehicle, an operating strategy for the motor vehicle is predefined. The operating strategy permits a predefined operating mode of the motor vehicle. In this context, values of at least a first operating variable of the predefined operating mode and/or values of at least an additional variable, which is independent of the predefined operating mode, are detected. At least one estimated value, which is representative of at least one anticipated value of the at least one first operating variable or at least one second operating variable of the predefined operating mode, is determined as a function of the values of the least one first operating variable and/or the values of the at least one additional variable. A prediction value, which is representative of an anticipated operating state of the motor vehicle, is determined as a function of the detected values of the at least one first operating variable and/or the detected values of the at least one additional variable and/or the determined at least one estimated variable. The determined at least one prediction value is compared with at least one predefined comparison value which is representative of at least one predefined operating state of the motor vehicle. The operating strategy is set as a function of a result of the comparison and as a function of the at least one estimated value in such a way that the motor vehicle is operated in such a way as to avoid the at least one predefined operating state. An operating strategy which is set in such a way permits a particularly efficient operating mode of the motor vehicle. The at least first or second operating variable is assigned to the predefined operating mode and represents, for example, a charge state of an energy store of the motor vehicle and/or a speed of the motor vehicle and/or a brake signal of the motor vehicle and/or a rotational speed. A state of the motor vehicle is represented by means of the first or second operating variable. The at least one additional variable represents, for example, a driving style of a driver of the motor vehicle and/or a positive gradient or a negative gradient of a section of the route being traveled on and/or navigation data and/or data of a driver assistance system. The at least one additional variable is therefore preferably not assigned to the predefined operating mode of the motor vehicle but is preferably independent of the predefined operating mode. The operating state of the motor vehicle can represent, for example, a charge state of the energy store, and a predefined operating state can represent, for example, a discharged and/or charged charge state of the energy store. If an anticipated operating state is determined which is equivalent to the predefined operating state, the operating strategy is set in such a way that the anticipated operating state is avoided as far as possible.

In one embodiment, two forecast values are determined as a function of the detected values of the at least one first operating variable and/or the detected values of the at least one additional variable and/or at the least one determined estimated value. The forecast values each represent an anticipated operating state of the motor vehicle and are each assigned to different future time intervals. The at least one prediction value is determined as a function of the at least two forecast values. The at least two forecast values represent, like the prediction value, the anticipated operating state of the motor vehicle. The prediction value can be determined, for example, by means of filtering of the at least two forecast values. Therefore, for example that forecast value whose assigned operating state is most likely to occur is assigned to the prediction value. The future time interval in which the anticipated operating state occurs is therefore also known.

In one embodiment, the at least two forecast values are determined by means of at least one artificial neural network. In particular, the anticipated operating states can be determined particularly reliably by means of recurrent artificial neural networks. In this context, the at least one artificial neural network is trained in such a way that operating states which are equivalent to the predefined operating states are particularly reliably determined.

In a further embodiment, the at least two forecast values are determined as a function of the availability of the at least one additional variable, either by means of a first artificial neural network or by means of a second artificial neural network. The first artificial neural network is preferably trained as a function of the at least one additional variable, while the second artificial neural network is trained independently of the at least one additional variable. As a result, even when an additional variable is not available, reliable determination of the forecast values is ensured.

In a further embodiment, the prediction value is determined as a function of a chronological sequence of the at least two forecast values. This has the advantage that the prediction value is determined particularly reliably.

In a further embodiment, the motor vehicle has a hybrid drive with a first and a second energy converter and with at least one energy store. The first energy converter is embodied as an electric machine. In this context, the first and second energy converters are actuated as a function of the operating strategy. This has the advantage that a motor vehicle can be operated particularly efficiently with a hybrid drive.

FIG. 1 illustrates an energy management system of a motor vehicle. The energy management system can be referred to as a device for operating the motor vehicle. The motor vehicle comprises a hybrid drive system which has two different energy converters, for example an internal combustion engine and an electric machine, which can act parallel or in series on driven wheels of the motor vehicle. A predefined operating strategy OPS predefines an operating mode of the two energy converters in order to make available the torque predefined by a driver by means of an accelerator pedal to the driven wheels of the motor vehicle. An internal combustion operating mode and/or an electric operating mode of the motor vehicle can be predefined by means of the operating strategy OPS. In this context, different operating strategies OPS can bring about the same torque, predefined by the driver, at the driven wheels. The operating strategy OPS is set in such a way that fuel consumption of the internal combustion engine is as far as possible minimal and therefore an operating mode of the motor vehicle is as efficient as possible. It is also ensured that the driving performance which is required by the driver is made available, and that the driving behavior of the motor vehicle is as far as possible always the same and therefore reproducible.

The energy management system (FIG. 1) comprises a data acquisition unit CU with a sensor unit S which is designed to detect, for example, a charge state of an energy store and/or a speed of the motor vehicle and/or a brake signal and/or a rotational speed of the respective energy converter and to make available the detected values as sensor data. The sensor data represent operating variables S_D1 of the motor vehicle.

The data acquisition unit CU also comprises a section-of-route determining unit RCU which is designed to determine a positive or negative gradient of a section of route. The positive or negative gradient of a section of route can be determined, for example, as a function of a predefined weight of the motor vehicle and a predefined torque in order to reach a speed, predefined by the driver, of the motor vehicle on a level section of route. Other methods of determining the positive or the negative gradient of a section of route are basically also possible.

Furthermore, the data acquisition unit CU comprises a navigation system N which is designed to make available navigation data, for example a curve profile of a section of route predefined by the driver and/or traffic jam data, for example TMC data. In addition to the navigation system N, the data acquisition unit CU can also detect the data from other driver assistance systems, for example distance data relating to motor vehicles traveling ahead.

The data acquisition unit CU also comprises a driving style data acquisition unit DR which is designed to determine a driving style of the driver of the motor vehicle. In this context it is possible, for example, for the driver to be categorized as sporty, economical, cooperative or uncooperative as a function of a determined average accelerator pedal position and/or determined changes in the accelerator position over time. The determined driving style is also made available in the form of data.

The data relating to the section-of-route determining unit RCU, the navigation system N and the driving style detection DR, which are made available by the data acquisition unit CU, are referred to below as additional variables S_D2, since they are preferably independent of the predefined operating mode of the motor vehicle.

On the input side, the operating variables S_D1 and the additional variables S_D2 are assigned to an estimation unit EU. The estimation unit EU comprises a driver estimation unit DE and a section-of-route estimation unit RE. The driver estimation unit DE is designed to determine a first and a second energy estimated value as a function of the operating variables S_D1 and the additional variables S_D2. The first energy estimated value represents an anticipated energy requirement of the predefined operating strategy OPS, which the electric machine requires on the basis of the driving style of the driver. The second energy estimated value represents a value which is anticipated for regenerated energy on the basis of the driving style of the driver, which energy can be made available by a generator operating mode of the electric machine, for example during overrun conditions of the motor vehicle. The regenerated energy is preferably used to charge the energy store.

The section-of-route estimation unit RE determines a third and a fourth energy estimated value as a function of the operating variables S_D1 and the additional variables S_D2. The third energy estimated value represents an energy requirement of the predefined operating strategy OPS, which is assigned to the electric machine for operating the motor vehicle, for example during a positive gradient of the section of route. The fourth energy estimated value represents a value of the regenerated energy which can be made available on the basis of the generator operating mode of the electric machine, for example on the basis of the overrun conditions during a negative gradient of the section of route.

The estimation unit EU comprises, for example, in each case a characteristic diagram for determining the respective energy estimated value. It is therefore possible to determine the anticipated energy requirement or the anticipated value of the regenerated energy on the basis of the respective characteristic diagram. The characteristic diagrams have been determined, for example, by means of measuring journeys and/or simulations.

The determined first, second, third and fourth energy estimated values are referred to below as estimated value S_D3 and are made available to a forecast unit PU and a comparison unit EPU.

In order to ensure the efficient operating mode of the motor vehicle, a completely charged and/or a discharged charge data of the energy store state is to be avoided. Therefore, for example a completely charged energy store cannot be charged further by means of regenerated energy. On the other hand, if the energy store is discharged, the driving behavior of the motor vehicle, for example the acceleration assistance by means of the electric machine, is no longer possible and the driving behavior therefore cannot be reproduced. The completely charged and/or the discharged charge state of the energy store can therefore be referred to as predetermined operating states of the motor vehicle which are to be avoided as far as possible while the motor vehicle is operating.

The forecast unit PU comprises a prediction unit FU and a detector unit DET. The detected values of the operating variables S_D1 and of the additional variables S_D2 and the estimated variables S_D3 are assigned on the input side to the prediction unit FU.

The prediction unit FU is preferably embodied as at least one recurrent, artificial neural network. Recurrent artificial neural networks, for example Elman or Jordan networks, are suitable for determining a future behavior of a dynamic system. The at least one recurrent artificial neural network is designed to determine at least two, for example six, forecast values PV as a function of the operating variables S_D1 and/or the additional variables S_D2 and/or the estimated values S_D3, which forecast values PV are assigned in each case to different future time intervals. The forecast values PV represent in each case an anticipated charge state of the energy store. It is therefore possible, for example, to assign in each case a forecast value PV to a respective future time interval of 150 s. It is therefore possible to determine anticipated charge states of the energy store for a future forecast time period, for example of 15 min. So that future charge states can be determined by means of the at least one recurrent artificial neural network, said artificial neural network must be trained before its use. In this context, the training can be carried out by means of exemplary values of the operating variables S_D1, of the additional variables SD_2 and estimated variables SD_3, wherein the exemplary values are determined, for example, from measurement journeys and/or from simulations.

The prediction unit FU preferably has at least one first and at least one second recurrent artificial neural network. The additional variables S_D2 are preferably taken into account during the training of the first recurrent artificial neural network, while the additional variables S_D2, or at least one additional variable S_D2, are/is taken into account during the training of the second recurrent artificial neural network. It is therefore possible, for example when navigation data of the navigation system N are available, to use the first and otherwise the second recurrent artificial neural network to determine the forecast values PV. The estimation unit EU preferably also has a plurality of characteristic diagrams which are selected as a function of the availability of the additional variables S_D2, or at least of an additional variable S_D2, in order to determine the respective energy estimated value.

Figure 2:
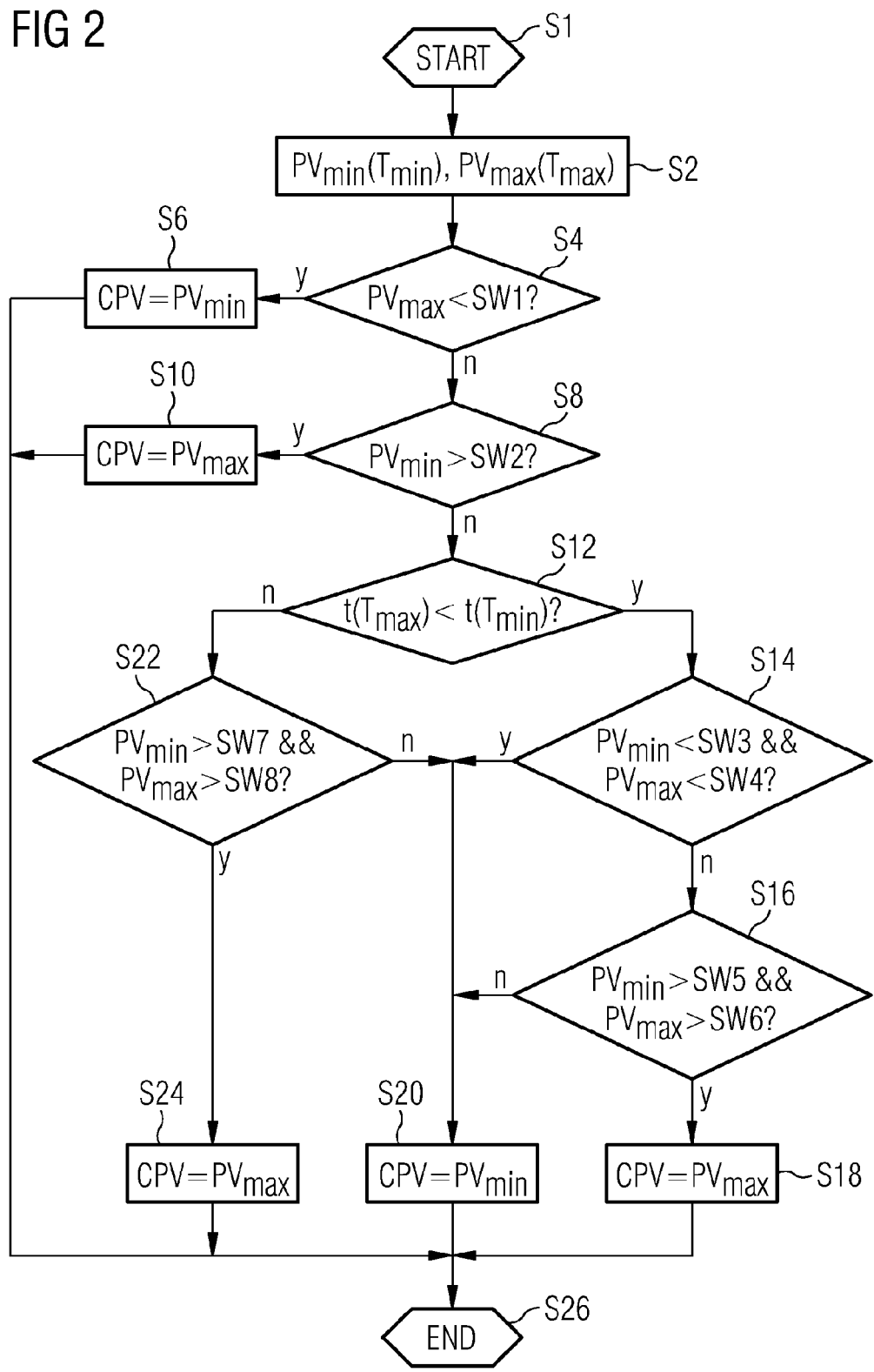
FIG. 2 shows a first flowchart.

The forecast values PV are assigned on the input side to the detector unit DET. The detector unit DET is designed to determine a prediction value CPV as a function of the forecast values PV, and to make available said forecast values PV on the output side. The forecast values PV have, for example, values in a value range between 0.0 and 1.0, wherein a 0% charge state of the energy store is assigned to a value 0.0, and a 100% charge state of the energy store is assigned to a value 1.0. In this context, the prediction value CPV is preferably determined by means of filtering according to FIG. 2. The filtering is started in a step S1. In a step S2, a minimum $PV_{min}$ and a maximum $PV_{max}$ of the prediction values PV and their assigned time intervals $T_{min}$ and $T_{max}$ are determined. In this context, different threshold values SW1 to SW8 are determined and are compared with the determined minimum $PV_{min}$ or the determined maximum $PV_{max}$. In a step S4, the maximum $PV_{max}$ is compared with the threshold value SW1, for example 0.6. If the maximum $PV_{max}$ is lower than the threshold value SW1, in a step S6 the minimum $PV_{min}$ is made available as a prediction value CPV on the output side. On the other hand, if the maximum $PV_{max}$ is higher than or equal to the threshold value SW1, in a step S8 the minimum $PV_{min}$ is compared with the threshold value SW2, for example 0.5. If the minimum $PV_{min}$ is higher than the threshold value SW2, in a step S10 the maximum $PV_{max}$ is predefined as the prediction value CPV. If the condition in the step S8 is not met, in a step S12 a comparison is carried out to determine whether the time interval $T_{max}$ which is assigned to the maximum $PV_{max}$ occurs chronologically before the time interval $T_{min}$ which is assigned to the minimum $PV_{min}$. If the condition in the step S12 is met, in a step S14 a comparison is carried out to determine whether the minimum $PV_{min}$ is lower than the threshold value SW3, for example 0.1, and the maximum $PV_{max}$ is lower than the threshold value SW4, for example 1.0. If this condition is met, in a step S20 the minimum $PV_{min}$ is predefined as a prediction value CPV on the output side. If the condition in the step S14 is not met, in a step S16 a comparison is carried out to determine whether the minimum $PV_{min}$ is higher than the threshold value SW5, for example 0.3, and the maximum $PV_{max}$ is higher than the threshold value SW6, for example 0.8. If this condition is met, in a step S18 the maximum $PV_{max}$ is predefined as a prediction value CPV on the output side. Otherwise, in the step S20 the minimum is predefined as a prediction value CPV on the output side. On the other hand, if the condition in the step S12 is not met, in a step S22 a comparison is carried out to determine whether the minimum $PV_{min}$ is higher than the threshold value SW7, for example 0.3, and the maximum is higher than the threshold value SW8, for example 0.9. If this condition is met, in a step S24 the maximum $PV_{max}$ is predefined as a prediction value CPV on the output side. Otherwise, in the step S20 the minimum $PV_{min}$ is predefined as a prediction value CPV on the output side.

Figure 4:
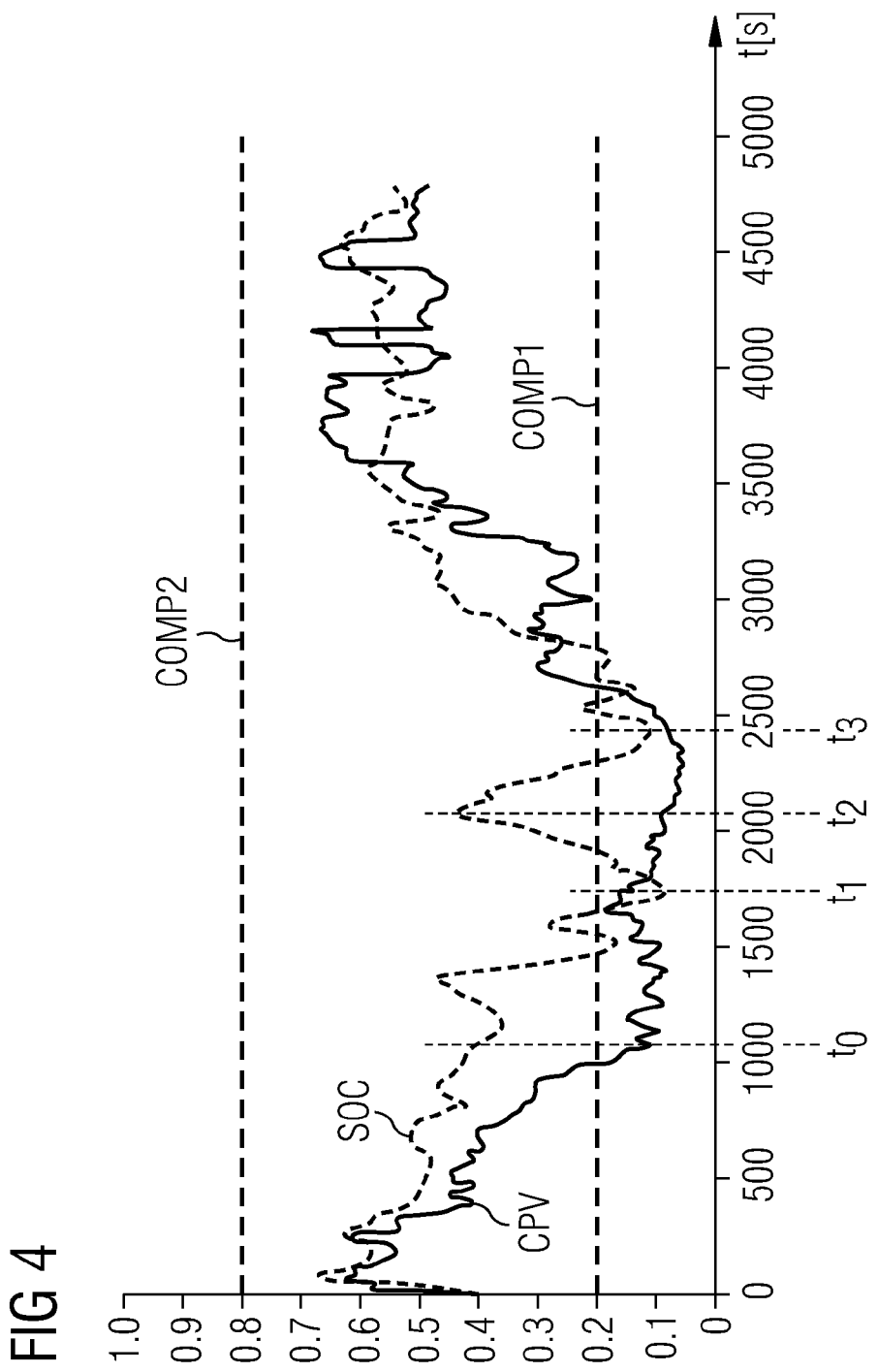
FIG. 4 shows a time profile of a prediction value.

FIG. 4 illustrates a time profile of the determined prediction value CPV and a profile of an actual charge state SOC of the energy store, which profile would be detected in what is referred to as an open-loop test during the predefined operating strategy OPS, i.e. without adaptation of the predefined operating strategy OPS. A value range between 0.0 and a first comparison value COMP1 represents the discharged charge state of the energy store, while a value range between 1.0 and a second comparison value COMP2 represents the charged charge state of the energy store. At a time t0, a discharged charge state of the energy store is predicted which occurs approximately 10 minutes before a time t1 at which the discharged charge state of the energy store actually occurs.

Alternatively, the discharged charge state of the energy store can also be predicted at the time at which the prediction value CPV drops below the first comparison value COMP1, for example after approximately 1000 s.

Since the operating strategy on the basis of the open-loop test does not react to the anticipated discharged charge state of the energy store, the prediction value CPV remains lower at a time t3 than the first comparison value COMP1, owing to a second anticipated discharged charge state of the energy store. The prediction value CPV would then only be predefined with a higher value than the first comparison value COMP1 after the time t0 by means of the detector unit DET if the maximum in the interim would occur at a time t2 in the region of a completely charged charge state of the energy store, for example in the region 0.9. This would correspond to a satisfied condition of the step S22 in FIG. 2. If the adaptation of the operating strategy were to occur as a function of the determined prediction value CPV in what is referred to as a closed-loop test, a discharged charge state SOC of the energy store would preferably not occur at the time t1.

On the input side, the determined prediction value CPV is fed to the comparison unit EPU (FIG. 1), and the estimated value S_D3 of the estimation unit EU are fed to the comparison unit EPU (FIG. 1). The comparison unit EPU is designed to determine a basic energy price as a function of the estimated value S_D3. This can be carried out, for example, by means of a table which is stored in a data memory of the energy management system, and the determined prediction value CPV assigned to a predefined basic energy price. In addition, the comparison unit EPU is designed to compare the prediction value CPV with the first comparison value COMP1, for example 0.2, and the second comparison value COMP2, for example 0.8, and to determine an additional energy price as a function of the result of the comparison. The comparison unit EPU is, furthermore, designed to determine an overall energy price S_P as a function of the basic energy price and the additional energy price. The overall energy price S_P represents here the availability of the electrical energy in the motor vehicle. If, for example, an anticipated discharged charge state of the energy store is determined by means of the forecast unit PU, the additional energy price and therefore the overall energy price are increased. As a result, a high energy price is represented. On the other hand, if an anticipated, completely discharged charge state of the energy store is determined by means of the forecast unit PU, the additional energy price and therefore the overall energy price are reduced. As a result, a low energy price is represented. For example, if a prediction value CPV of 0.2 is determined, the additional energy price is increased only slightly, while if a prediction value CPV of, for example, 0.1 is determined, the additional energy price is increased to a very great degree. Preferably, no change in the additional energy price results from the determined prediction values CPV, which between the first and second comparison values COMP1 and COMP2, with the overall energy price S_P being preferably equal to the determined basic energy price in this case.

The determined overall energy price S_P is assigned on the input side to a decision unit DU which is designed to set, as a function of the overall energy price S_P, the operating strategy OPS for operating the motor vehicle in such a way that an anticipated discharged charge state, or an anticipated completely charged charge state, of the energy store is avoided as far as possible. If, for example, an anticipated discharged charge state of the energy store is determined, it is possible, for example, for the internal combustion engine to be actuated by means of the decision unit DU in such a way that a generator which is coupled to the internal combustion engine is driven and charges the energy store. On the other hand, if, for example, an anticipated completely charged charge state of the energy store is determined, the internal combustion engine is, for example, switched off and the motor vehicle is operated purely electrically. Preferably, the overall energy price is already adapted at an early time on the basis of the early forecast of the charge state of the energy store, so that the driver as far as possible does not notice adaptation of the operating strategy OPS. This also permits particularly efficient use of the energy store in the motor vehicle.

Figure 3:
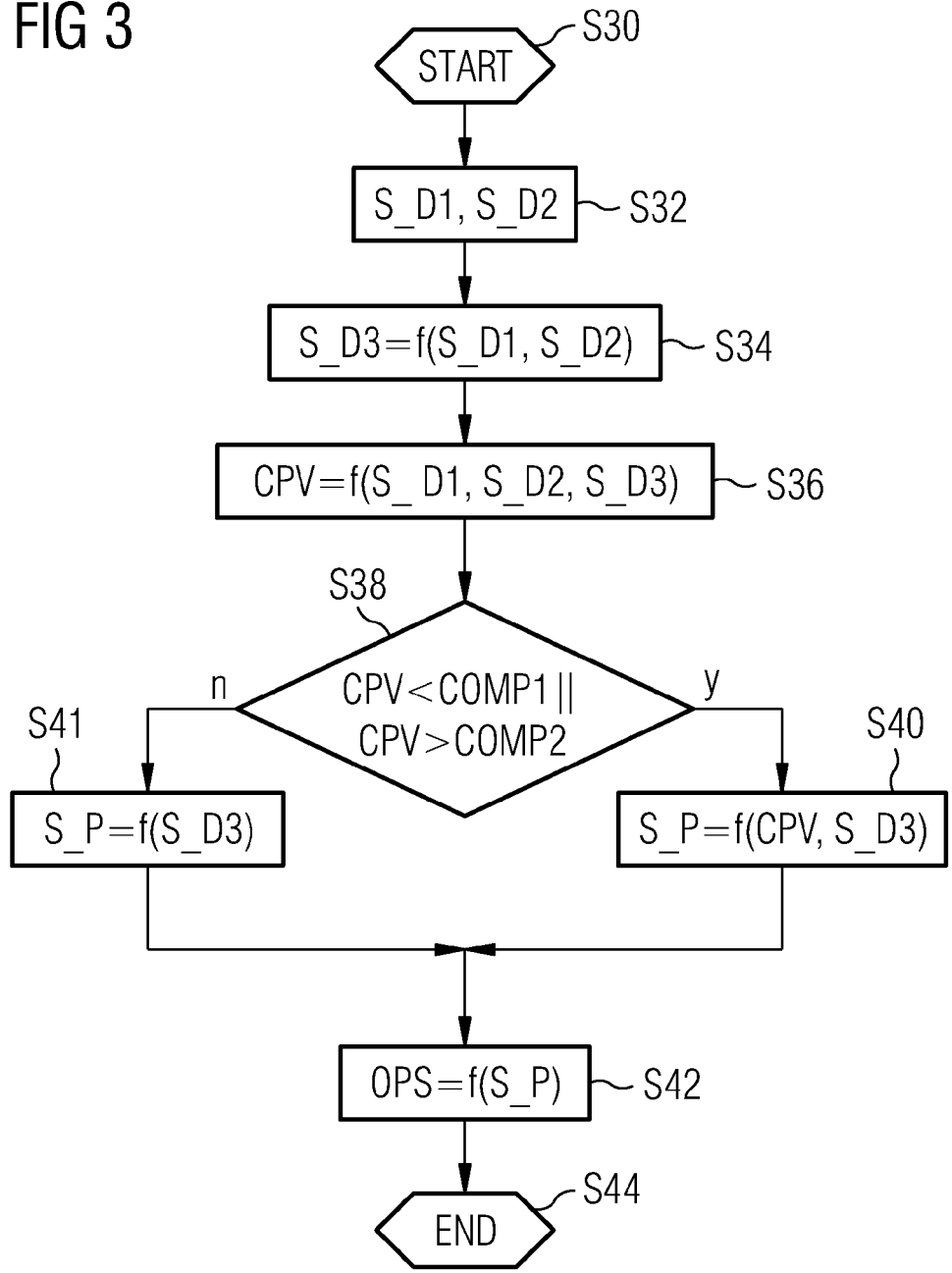
FIG. 3 shows a second flowchart.

The components of the energy management system which are illustrated in FIG. 1 are preferably embodied as software components of a program (FIG. 3) which is executed, for example, by means of a data processing unit of the energy management system as a method for operating the motor vehicle.

The program (FIG. 3) is started in a step S30. In a step S32, values of at least one operating variable S_D1, for example the charge state of the energy store or the speed of the motor vehicle and/or values of at least one additional variable S_D2, for example the positive gradient of the section of route, are detected. In a step S34 the at least one estimated value S_D3, for example the first, second, third and fourth energy estimated values, are determined as a function of the detected values of the at least one operating variable S_D1 and of the at least one additional variable S_D2. In a step S36, the at least one prediction value CPV is determined as a function of the detected values of the at least one operating variable S_D1 and of the at least one additional variable S_D2 and the at least one estimated value S_D3, which prediction value CPV is compared in a step S38 with the first and second comparison values COMP1 and COMP2. If the prediction value CPV is neither lower than the first comparison value COMP1 nor higher than the second comparison value COMP2, in a step S41 the overall price S_P is determined as a function of the at least one estimated value S_D3 and independently of the prediction value CPV. On the other hand, if the determined prediction value CPV is either lower than the first comparison value COMP1 or higher than the second comparison value COMP2, in a step S40 the overall energy price S_P is determined as a function of the at least one estimated value S_D3 and of the prediction value CPV.

In a step S42, the operating strategy OPS and therefore the operation of the hybrid drive system are set, as a function of the determined overall price S_P, in such a way that the predefined operating state of the motor vehicle, i.e. the discharged or the charged charge state of the energy store, is avoided as far as possible. In a step S44, the program is ended. Alternatively, it is also possible to restart the program in the step S32.

Alternatively it is also possible to use the energy management system according to FIG. 1 for operating other components of the motor vehicle. For example, an anticipated temperature can be predicted in a power electronic unit of the motor vehicle, which power electronic unit is designed, for example, to actuate the electric machine. It is possible, for example, for a current which is made available by the power electronic unit to be detected as at least one operating variable S_D1. It is also possible, for example, for the driving style of the driver to be used as an additional variable S_D2. It is possible, for example, for the temperature of the power electronic unit to be determined as an estimated value S_D3, and for a maximum permissible temperature of the power electronic unit to be predefined as a predefined operating state. If, for example, an anticipated maximum temperature is determined by means of the prediction value CPV, it is possible, for example, for the operating strategy for operating the power electronic unit to require increased cooling of the power electronic unit.

What is claimed is:

1. A method for operating a motor vehicle, comprising:
    predefining an operating strategy for the motor vehicle, wherein the operating strategy permits a predefined operating mode of the motor vehicle,
    detecting at least a first operating variable of the predefined operating mode and values of at least an additional variable which is independent of the predefined operating mode, including a value of a detected driving style of a driver of the motor vehicle,
    determining at least one estimated value of an energy requirement or energy availability as a function of the at least one first operating variable and the values of the at least one additional variable, including the value of the detected driving style of the driver,
    determining at least one prediction value, which is representative of an anticipated charge state of an energy store of the motor vehicle, as a function of at least one of the detected values of the at least one first operating variable, the detected values of the at least one additional variable, and the determined at least one estimated variable,
    comparing the at least one determined prediction value with at least one predefined comparison value, which is representative of at least one predefined charge state of the energy store,
    setting the operating strategy as a function of a result of the comparison and as a function of the at least one estimated value in such a way that the motor vehicle is operated in such a way as to avoid the at least one predefined charge state of the energy store.

2. The method according to claim 1, wherein at least two forecast values, which each represent an anticipated charge state of the energy store and which are each assigned to different future time intervals, are determined as a function of at least one of the detected values of the at least one first operating variable, the detected values of the at least one additional variable, and the at least one determined estimated value, and
    the at least one prediction value is determined as a function of the at least two forecast values.

3. The method according to claim 2, in which the at least two forecast values are determined by means of at least one artificial neural network.

4. The method according to claim 2, in which the at least two forecast values are determined as a function of the availability of the at least one additional variable either by means of a first artificial neural network or by means of a second artificial neural network.

5. The method according to claim 2, in which the prediction value is determined as a function of a chronological sequence of the at least two forecast values.

6. A device for operating a motor vehicle, comprising
    a decision unit, which is operable to predefine an operating strategy for the motor vehicle, wherein the operating strategy permits a predefined operating mode of the motor vehicle,
    a data detection unit which is operable to detect at least a first operating variable of the predefined operating mode and values of at least an additional variable which is independent of the predefined operating mode, including a value of a detected driving style of a driver of the motor vehicle,
    an estimation unit which is operable to determine at least one estimated value of an energy requirement or energy availability as a function of the at least one first operating variable and the values of the at least one additional variable, including the value of the detected driving style of the driver,
    a forecast unit which is designed to determine at least one prediction value, which is representative of an anticipated charge state of an energy store of the motor vehicle, as a function of at least one of the detected values of the at least one first operating variable, the detected values of the at least one additional variable, and the determined at least one estimated variable,
    a comparison unit which is operable to compare the at least one determined prediction value with at least one predefined comparison value, which is representative of at least one predefined charge state of the energy store, and to actuate the decision unit, as a function of a result of the comparison and as a function of the at least one estimated value, in such a way that the operating strategy is set in such a way that the motor vehicle is operated in such a way as to avoid the at least one predefined charge state of the energy store.

7. The device according to claim 6, wherein the motor vehicle has a hybrid drive with a first and a second energy converter and with at least one energy store, wherein the first energy converter is embodied as an electric machine, and the device is designed to actuate the first and second energy converters as a function of the operating strategy.

8. A motor vehicle, comprising an energy management system for predefining an operating strategy for the motor vehicle, wherein the operating strategy permits a predefined operating mode of the motor vehicle, the energy management system comprising:

an acquisition unit for detecting at least a first operating variable of the predefined operating mode and values of at least an additional variable which is independent of the predefined operating mode, including a value of a detected driving style of a driver of the motor vehicle, an estimation unit for determining at least one estimated value of an energy requirement or energy availability as a function the at least one first operating variable and the values of the at least one additional variable, including the value of the detected driving style of the driver, a forecast unit for determining at least one prediction value, which is representative of an anticipated charge state of an energy store of the motor vehicle, as a function of at least one of the detected values of the at least one first operating variable, the detected values of the at least one additional variable, and the determined at least one estimated variable, a comparison unit for comparing the at least one determined prediction value with at least one predefined comparison value, which is representative of at least one predefined charge state of the energy store, a decision unit for setting the operating strategy as a function of a result of the comparison and as a function of the at least one estimated value in such a way that the motor vehicle is operated in such a way as to avoid the at least one predefined charge state of the energy store.

9. The motor vehicle according to claim 8, wherein the acquisition unit is coupled with the estimation unit and the forecast unit, the estimation unit is coupled with the forecast unit and the comparison unit, the forecast unit is coupled with the comparison unit, and the comparison unit is coupled with the decision unit.

10. The motor vehicle according to claim 8, wherein the energy management system is operable to determine at least two forecast values, which each represent an anticipated charge state of the energy store and which are each assigned to different future time intervals, as a function of at least one of the detected values of the at least one first operating variable, the detected values of the at least one additional variable, and the at least one determined estimated value, and to determine the at least one prediction value as a function of the at least two forecast values.

11. The motor vehicle according to claim 10, further comprising an artificial neural network for determining the at least two forecast values.

12. The motor vehicle according to claim 10, wherein the energy management system is operable to determine determine the at least two forecast values as a function of the availability of the at least one additional variable either by means of a first artificial neural network or by means of a second artificial neural network.

13. The motor vehicle according to claim 10, wherein the energy management system is operable to determine the prediction value as a function of a chronological sequence of the at least two forecast values.

14. The motor vehicle according to claim 8, wherein the motor vehicle has a hybrid drive with a first and a second energy converter and with at least one energy store, wherein the first energy converter is embodied as an electric machine, and the device is designed to actuate the first and second energy converters as a function of the operating strategy.

* * * * *